April 12, 1960

C. T. FLACHBARTH 2,932,683

FITTINGS FOR FLOOR DUCT SYSTEMS

Filed Sept. 6, 1956

INVENTOR
Charles T. Flachbarth
by
Pennie Edmonds Morton Barrows Taylor
ATTORNEYS United States Patent Office
2,932,683
Patented Apr. 12, 1960

2,932,683

FITTINGS FOR FLOOR DUCT SYSTEMS

Charles T. Flachbarth, Springfield, Pa., assignor to Walker Brothers, Conshohocken, Pa., a corporation of Pennsylvania Application September 6, 1956, Serial No. 608,368

8 Claims. (Cl. 174—48)

This invention relates to duct systems of electrical distribution of the type now widely installed in the floors of commercial, industrial, and institutional buildings. More particularly, the invention is concerned with a novel fitting for use at an outlet of a floor duct system to serve as a housing for a receptacle, terminal blocks, or other connecting means. The new fitting is of simple inexpensive construction and of attractive appearance. It can be easily installed and, when in place, it cannot be readily dislodged and is not liable to damage, so that it affords good protection to the connecting means within it. If, after a period of use, service at the outlet, where the fitting is located, is to be discontinued, the fitting may be readily dismantled and removed from the outlet, so that the latter can be closed.

For a better understanding of the invention, reference may be had to the accompanying drawing, in which Fig. 1 is a top plan view, with parts broken away, of the fitting of the invention;

Figures 1, 2:
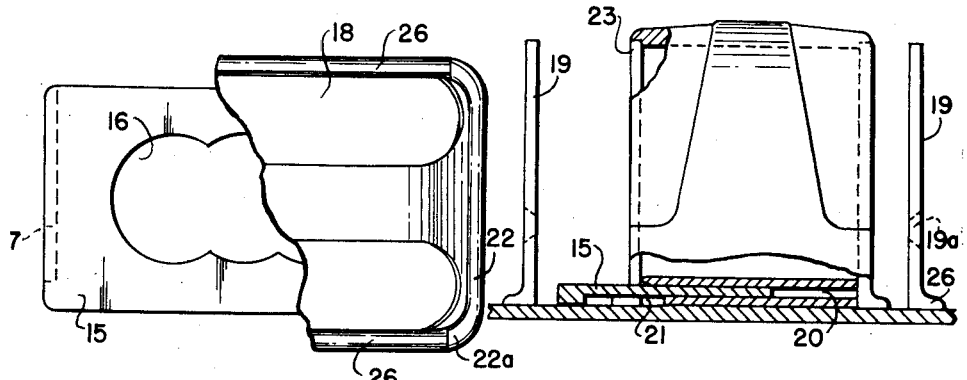
Fig. 2 is a partially exploded side view of the fitting with parts broken away and shown in vertical section.
Figure 3:
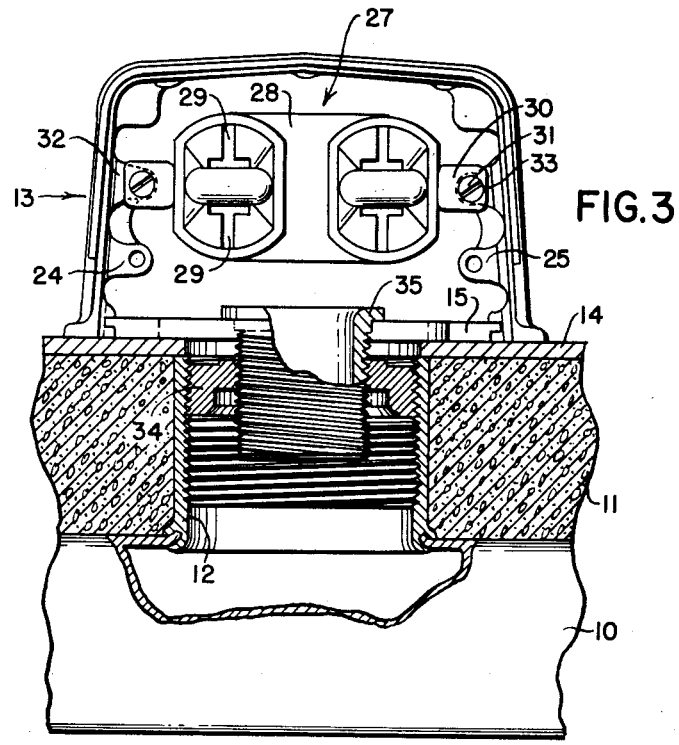
Fig. 3 is a view of the fitting installed in an insert in a duct of an underfloor duct system, with one cover of the fitting removed and parts shown in elevation and in section.
Figure 4:
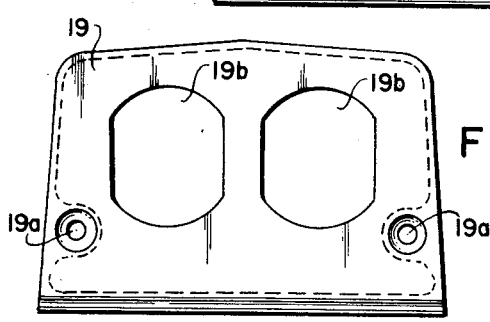
Fig. 4 is a view in elevation of one form of cover plate used in the fitting of the invention.

The new fitting may be employed in duct systems of the underfloor type, in which the ducts lie beneath the floor surface, and also in systems of the flush type, in which the tops of the ducts lie level with the top of the floor and are covered by a floor covering, such as linoleum. In the drawing, the new fitting is shown in use with an underfloor duct system, which includes runs of ducts 10 buried in the floor structure 11 below the floor surface and having inserts 12 mounted in spaced openings in their top walls and extending upward to terminate at the floor surface. A fitting 13 embodying the invention is illustrated in Fig. 3 as resting on the linoleum or other floor covering 14 and being anchored in one of the inserts of such a duct.

The fitting comprises a base plate 15, which is of generally rectangular form and has an opening 16 through it formed by three intersecting circular cuts. At its ends, the base is undercut, as indicated at 17, throughout almost the complete length of each end to form ribs lying upward from its bottom surface.

The fitting is completed by a shell 18 and a pair of like cover plates 19. The shell is of inverted U-shape and its legs are of at least the width of the base. The legs are provided with transverse grooves 20 on their inner surfaces lying upward a short distance from the lower ends and each leg is cut away to form a recess 21 beneath its groove 20 adjacent one end thereof. The legs are so spaced that the ribs at the ends of the base may be inserted in grooves 20 and the base moved to lie wholly within the shell with the recesses 21 receiving the portions of the base at the closed ends of the undercut channels 17. At their lower ends, the legs of the shell have outwardly projecting feet 22, which extend around the corners at the outer edges of the legs, as indicated at 22a.

The cover plates 19 are secured to the shell to close its ends and, for this purpose, the shell is formed with grooves 23 in its end faces, in which the cover plates may be received. Each plate is held in position by a pair of screws, which pass through openings 19a in the plates and enter threaded bores in internal ribs 24, 25 extending inward from the opposed faces of the legs of the shell. Each plate 19 has a foot 26 extending outwardly along its lower edge and, when the plates are in place in grooves 23, the plates overlap the side edges of the base and their feet 26 lie between the ends 22a of the feet 22 on the shell and serve as continuations of feet 22.

The fitting is intended to contain electrical connecting means, such as a receptacle or terminal blocks, and the fitting is illustrated as containing a pair of standard duplex receptacles disposed back to back. One such receptacle is shown at 27 and it includes a body 28 of insulating material having openings 29 for receiving the prongs of a plug and with metallic ears 30 projecting outwardly from its ends. The receptacle is secured in place by means of screws 31, which pass through openings in the ears and enter threaded bores in internal ribs 32, 33 extending inward from the opposed surfaces of the legs above the ribs 24, 25. The cover plates are formed with openings 19b of a size and location depending upon the kind of connecting means mounted within the fitting and, since the fitting shown is intended to be used with receptacles of the duplex type, each plate 19 has a pair of openings 19b, through which are exposed the portions of the receptacles having the openings for access to the terminals. When the fitting is used for low tension work, one or both cover plates may have a circular opening, in which an insulating bushing is mounted.

In mounting the new fitting in place within an insert in an underfloor duct system, the linoleum 14 or other floor material lying above the top of the insert is cut away to expose the insert, the cap normally closing the insert is removed, and the wires to be connected to the receptacles or other terminal means in the fitting are drawn through the duct and out through the insert. An internally threaded bushing 34 is then slipped over the wires and screwed into the insert to lie slightly below the top. The wires are passed through the opening in the base 15 of the fitting and the base is placed upon the floor covering above the insert. A headed externally threaded bushing 35 is slipped over the wires and then passed through one of the intersecting circular cuts forming the opening in the base, after which bushing 35 is threaded into the bushing 34 within the insert. When bushing 35 is screwed tightly in place, it draws the base tightly against the floor covering and anchors the base against movement. With the base in position as described, the shell is slipped over the base with the ribs at the ends of the base entering the grooves 20 on the inner faces of the legs of the shell. The wires are now connected to the terminal screws of the receptacles and the receptacles are mounted in position on the ends of the ribs 33 of the shell. The fitting finally completed by placing the two cover plates in position to close the ends of the shell.

In the completed receptacle, the cover plates, which extend down to overlap the sides of the base, prevent relative movement of the shell and base in one direction and the interlocking of the base and shell resulting from the ribs at the ends of the base being received in grooves 20 on the legs of the shell prevent the shell from being raised from the base or being moved in a direction parallel to the cover plates. The base of the fitting is firming anchored in position by the bushing 35, which secures the base to the bushing 34 within the insert, and, since the fitting is compact and the shell is secured in place along the entire outline of the base, there is little possibility that the fitting will be dislodged or injured by accidental blows. The provision of the intersecting circular cuts forming the opening 16 permits the fitting to be placed in different locations relative to an insert in the duct and makes it possible to install two fittings side by side in inserts in adjacent ducts, even though the ducts are closely spaced. The possibility of placing a fitting in a choice of locations relative to an insert provides flexibility in avoiding partitions, furniture, and other obstacles when an installation is made.

The use of the new fitting in flush duct systems is essentially the same as in underfloor systems. In flush systems, the inserts are of ferrule form and project above the top of the ducts a distance equal to the thickness of the floor covering, such as linoleum, laid on the floor over the ducts. Each ferrule is internally threaded and a fitting is held in place on the floor covering by means of a bushing passed through an opening in the base plate of the fitting and threaded into the ferrule and a nut screwed on the bushing and engaging the base plate around the ferrule. In all other respects, the fittings for use in the two types of systems are the same.

I claim:

1. A fitting for use with a floor duct system having ducts within the floor structure and inserts extending upward from the top of the ducts, which comprises a base plate adapted to rest on the floor surface, means for connecting the base plate to an insert, a separate shell of inverted U-section adapted to receive an electrical receptacle and having legs spaced to receive the base plate between them, the base plate and the shell having interfitting parts preventing relative movement of the base plate and shell along one line while permitting relative movement of the base plate and shell along a line transverse to said one line in the plane of the base plate, and a pair of cover plates secured to the ends of the shell to close the openings thereof and overlapping adjacent edges of the base plate to prevent relative movement of the base plate and shell along said line, said cover plates being co-extensive with the openings at the ends of the shell.

2. The fitting of claim 1, in which the interfitting parts on the base plate and the shell include grooves on one of the parts and ribs on the other part received in the grooves.

3. The fitting of claim 2, in which the end edges of the base plate are formed with ribs and the shell has grooves on the opposed faces of its legs near their ends, which receive the ribs on the base plate.

4. The fitting of claim 1, in which the shell has means between the legs thereof for mounting an electrical fitting therein, and separate means for attachment at the cover plates.

5. The fitting of claim 1, in which the ends of the legs of the shell are formed with outwardly projecting feet and the cover plates have similar feet at their lower ends.

6. The fitting of claim 1, in which the means for connecting the base plate to an insert includes a headed bushing extending through an opening in the plate with its head overlying the edges of the opening.

7. The fitting of claim 6, in which the base plate is formed with a plurality of intersecting circular openings, each of a size to permit insertion of the bushing.

8. A fitting for use with a floor duct system having ducts within the floor structure and inserts extending upward from the top of the ducts, which comprises a base plate adapted to rest on the floor structure, means for connecting the base plate to an insert, a separate shell adapted to receive an electrical receptacle and having a top and side walls and having the bottom and at least one end open, means closing the other end of the shell, the sides of the shell being adapted to receive the base plate between them, the base plate and the side walls of the shell having interfitting parts preventing relative movement of the base plate and shell along one line while permitting relative movement of the base plate and shell along a line transverse to said one line in the plane of the base plate, and a cover plate secured to the open end of the shell to close the end opening thereof, the respective means closing said other end of the shell and said cover plate overlapping adjacent edges of the base plate to prevent relative movement of said base plate and said shell along said transverse line, said cover plate being co-extensive with the opening at the open end of the shell.

References Cited in the file of this patent

UNITED STATES PATENTS

| 466,416 | Hunt | Jan. 5, 1892 |
| 646,283 | Heatly et al. | Mar. 27, 1900 |
| 1,058,068 | Lamb | Apr. 8, 1913 |
| 1,106,103 | Lutz | Aug. 4, 1914 |
| 2,014,444 | Miller | Sept. 17, 1935 |
| 2,201,507 | Stilwell | May 21, 1940 |
| 2,548,706 | Corning | Apr. 10, 1951 |
| 2,738,892 | Wiesmann | Mar. 20, 1956 |
| 2,779,496 | Henderson | Jan. 29, 1957 |

FOREIGN PATENTS

| 717,629 | Great Britain | Oct. 27, 1954 |